(12) United States Patent
Beason et al.

(10) Patent No.: US 6,373,430 B1
(45) Date of Patent: Apr. 16, 2002

(54) COMBINED GLOBAL POSITIONING SYSTEM RECEIVER AND RADIO

(75) Inventors: Lawrence W. Beason, Olathe; Thomas H. Walters, Gardner; Ronald B. Kabler, Olathe, all of KS (US)

(73) Assignee: Gamin Corporation (TW)

( * ) Notice: Subject to any disclaimer, the term of this patent is extended or adjusted under 35 U.S.C. 154(b) by 0 days.

(21) Appl. No.: 09/306,938

(22) Filed: May 7, 1999

(51) Int. Cl.⁷ .............................................. H04B 7/185
(52) U.S. Cl. ........................... 342/357.09; 342/357.06; 342/419
(58) Field of Search ........................ 342/357.01, 357.06, 342/357.09, 357.08, 419, 455; 701/301

(56) References Cited

U.S. PATENT DOCUMENTS

| | | | |
|---|---|---|---|
| 3,063,048 A | 11/1962 | Lehan et al. ................. 343/112 |
| 4,021,807 A | 5/1977 | Culpepper et al. ........... 343/112 |
| 4,445,118 A | 4/1984 | Taylor et al. ................. 343/357 |
| 4,459,667 A | 7/1984 | Takeuchi ..................... 364/424 |
| 4,593,273 A | 6/1986 | Narcisse ..................... 340/539 |
| 4,651,157 A | 3/1987 | Gray et al. .................. 342/457 |
| 4,675,656 A | 6/1987 | Narcisse ..................... 340/539 |
| D291,288 S | 8/1987 | Suzuki ......................... D10/78 |
| 4,750,197 A | 6/1988 | Denekamp et al. ........... 379/58 |
| 4,809,005 A | 2/1989 | Counselman, III .......... 342/352 |
| D301,882 S | 6/1989 | Watanabe ................... D14/140 |
| D302,271 S | 7/1989 | Watanabe ................... D14/140 |
| 4,907,290 A | 3/1990 | Crompton ..................... 455/56 |
| 4,912,756 A | 3/1990 | Hop ............................. 379/60 |
| 4,953,198 A | 8/1990 | Daly et al. .................... 379/61 |
| D312,650 S | 12/1990 | Charrier ..................... D16/242 |
| D314,713 S | 2/1991 | Cirrany et al. ............... D10/65 |
| 5,021,794 A | 6/1991 | Lawrence ................... 342/457 |
| 5,043,736 A | 8/1991 | Darnell et al. ............... 342/357 |
| D326,450 S | 5/1992 | Watanabe ................... D14/138 |
| 5,119,504 A | 6/1992 | Durboraw, III ............. 455/54.1 |
| 5,144,323 A | 9/1992 | Yonkers ...................... 342/386 |
| 5,146,231 A | 9/1992 | Ghaem et al. ............... 342/419 |
| 5,172,110 A | 12/1992 | Tiefengraber .......... 340/825.49 |

(List continued on next page.)

FOREIGN PATENT DOCUMENTS

| | | |
|---|---|---|
| EP | 0 061 674 | 10/1982 |
| EP | 0 123 562 | 10/1984 |
| EP | 0 242 099 | 4/1987 |
| FR | 2 541 801 | 2/1983 |

OTHER PUBLICATIONS

"Tendler Updates FoneFinder", Jun. 28, 1999 *Wireless Week*.
"Automatic Vehicle Monitoring" by J.S. Bravmen et al., Fairchild Space & Electronics, Co., Germantown, MD.
"Application of the Global–Positioning System (GPS) to Automatic Vehicle Monitoring"—1981 Carnahan Conference on Crime Countermeasures, University of Kentucky, Lexington, May 13–15, 1981.

*Primary Examiner*—Dao Phan
(74) *Attorney, Agent, or Firm*—Devon A. Rolf

(57) ABSTRACT

A portable GPS/radio unit communicates over a wireless radio network with at least one other unit which is transmitting radio signals over the network indicative of that unit's location. The GPS/radio unit comprises a GPS receiver for receiving satellite signals from a plurality of satellites, a radio receiver for receiving the radio signals transmitted by the other unit, a processor for calculating the unit's location as a function of the received satellite signals and for identifying the location of the other unit based on the received radio signals, and a display for indicating the location of the other unit. The display may indicate the respective locations of multiple units and may also display unique identifiers for each of the units. A system and method for indicating the location of one portable GPS/radio unit on the display of another portable GPS/radio unit involves at least two such units communicating with one another over a wireless radio network.

49 Claims, 2 Drawing Sheets

U.S. PATENT DOCUMENTS

| | | | |
|---|---|---|---|
| 5,193,215 A | 3/1993 | Olmers | 455/66 |
| 5,223,844 A * | 6/1993 | Mansell et al. | 342/357 |
| D337,582 S | 7/1993 | Lewo | D14/144 |
| 5,235,633 A | 8/1993 | Dennison et al. | 379/60 |
| 5,245,314 A | 9/1993 | Kah, Jr. | 340/539 |
| 5,289,195 A | 2/1994 | Inoue | 342/457 |
| 5,301,368 A | 4/1994 | Hirata | 455/78 |
| 5,307,277 A | 4/1994 | Hirano | 364/449 |
| 5,323,164 A | 6/1994 | Endo | 342/357 |
| 5,043,736 C1 | 9/1994 | Darnell et al. | 342/357 |
| 5,355,511 A | 10/1994 | Hatano et al. | 455/11.1 |
| 5,361,212 A | 11/1994 | Class et al. | 364/428 |
| 5,364,093 A | 11/1994 | Huston et al. | 273/32 R |
| 5,365,450 A | 11/1994 | Schuchman et al. | 364/449 |
| 5,379,224 A | 1/1995 | Brown et al. | 364/449 |
| 5,389,934 A | 2/1995 | Kass | 342/357 |
| 5,408,238 A | 4/1995 | Smith | 342/357 |
| 5,414,432 A * | 5/1995 | Penny et al. | 342/357 |
| 5,434,789 A | 7/1995 | Fraker et al. | 364/460 |
| 5,438,518 A | 8/1995 | Bianco et al. | 364/460 |
| D363,488 S | 10/1995 | Shumaker | D14/230 |
| 5,469,175 A | 11/1995 | Boman | 342/357 |
| D365,032 S | 12/1995 | Laverick et al. | D10/78 |
| D365,292 S | 12/1995 | Laverick et al. | D10/78 |
| 5,493,309 A * | 2/1996 | Bjornholt | 342/455 |
| 5,506,587 A | 4/1996 | Lans | 342/357 |
| 5,539,398 A | 7/1996 | Hall et al. | 340/907 |
| 5,555,286 A | 9/1996 | Tendler | 379/59 |
| 5,570,095 A * | 10/1996 | Drouilhet et al. | 342/357 |
| 5,581,259 A | 12/1996 | Schipper | 342/451 |
| 5,650,770 A | 7/1997 | Schlager et al. | 340/573 |
| 5,654,718 A | 8/1997 | Beason et al. | 342/357 |
| 5,689,269 A | 11/1997 | Norris | 342/357 |
| 5,781,150 A * | 7/1998 | Norris | 342/357 |
| 5,914,675 A * | 6/1999 | Tognazzini | 340/989 |
| 5,952,959 A | 9/1999 | Norris | 342/357 |
| 5,959,529 A * | 9/1999 | Kail | 340/539 |
| 5,963,130 A * | 10/1999 | Schlager et al. | 340/540 |
| 6,002,982 A | 12/1999 | Fry | 701/213 |
| 6,011,510 A | 1/2000 | Yee et al. | 342/357.09 |
| 6,052,597 A | 4/2000 | Ekstrom | 455/456 |
| 6,085,090 A * | 7/2000 | Yee et al. | 455/440 |
| 6,111,539 A | 8/2000 | Mannings et al. | 342/357.09 |
| 6,148,262 A | 11/2000 | Fry | 701/213 |

\* cited by examiner

COMBINED GLOBAL POSITIONING SYSTEM RECEIVER AND RADIO

BACKGROUND OF THE INVENTION

The present invention is directed generally to a combined global positioning system receiver and radio unit and, more particularly, to a system and method for transmitting position information between a plurality of such units so that one unit can display the position of one or more other units.

A global positioning system (GPS) is an electronic satellite navigation system which permits a user of the system to determine his or her position with respect to the Earth. Global positioning is accomplished through the use of a handheld GPS receiver device which detects and decodes signals from a number of satellites orbiting the Earth. The signals from each of these satellites indicate the position of the satellite and the time at which the signal was sent. To decode the satellite signals, known as spread spectrum signals, and thereby calculate the desired navigational data, a GPS receiver must first "find" or acquire the signals emitted from a minimum number of satellites. Once the receiver is "locked on" to the spread spectrum signals, continuous real-time calculation and monitoring of the user's global position and other navigational data (e.g., velocity of movement) can be performed.

GPS receivers have clocks which are synchronized with clocks in each of the satellites to determine how long it takes the signals to travel from the satellites to the receiver. In this regard, GPS receivers require a highly accurate internal frequency reference in order to acquire the spread spectrum GPS satellite signals. Specifically, acquiring spread spectrum satellite signals from a sufficient number of satellites to perform calculations requires determining the frequency of oscillation of the crystal oscillator utilized in the GPS receiver.

Once the GPS receiver has acquired and decoded signals from a minimum of three satellites, the GPS receiver can calculate the user's position (i.e., latitude and longitude) by geometric triangulation. Upon acquiring signals from a minimum of four satellites, the GPS receiver can also calculate the user's altitude. In addition, GPS receivers are able to calculate the user's speed and direction of travel by continuously updating the user's position. Accordingly, GPS receivers are highly valuable and widely used in navigational systems because of their ability to accurately compute the user's position on or near the Earth in real-time, even as the user is moving.

In addition to the growing popularity and demand for GPS navigational devices, portable two-way radios continue to enjoy widespread popularity. In 1996, the Federal Communications Commission (FCC) established the Family Radio Service (FRS) so that families and other small groups could communicate with one another over very short distances (typically less than one mile) at no charge and without an FCC license. The FRS, which is one of the Citizens Band Radio Services, includes 14 channels in the UHF 460 MHz band. There are a number of commercially available two-way radios which are designed for use with the FRS. The increasing use of both portable radios and global positioning systems has led to proposals to incorporate GPS receivers into portable radio devices.

Notwithstanding the many recent technological advancements in GPS and wireless radio equipment, and increased applications for those technologies, there is not currently a combined portable GPS/radio unit capable of displaying the location of another GPS/radio unit. Likewise, there is not currently a combined portable GPS/radio unit capable of displaying the location of multiple GPS/radio units.

SUMMARY OF THE INVENTION

It is an object of the present invention to provide a combined GPS/radio unit which is capable of displaying the location of at least one other such unit.

Another object of the present invention is to provide a combined GPS/radio unit which is capable of displaying its location and the location of at least one other such unit.

A further object of the present invention is to provide a combined GPS/radio unit which displays the location of another unit together with an identifier for that unit.

Still another object of the present invention is to provide a system in which a plurality of portable units communicate with one another over a wireless radio network and at least one of the units displays the location of other units.

Yet another object of the present invention is to provide a method for displaying the location of a first portable GPS/radio unit on a second portable GPS/radio unit.

These and other related objects of the present invention will become readily apparent upon further review of the specification and drawings. To accomplish the objects of the present invention, a portable GPS/radio unit is provided which is capable of communicating with one or more other such units over a wireless radio network, wherein each of the other units is adapted to transmit radio signals over the network indicative of that unit's location. The GPS/radio unit comprises a GPS receiver for receiving satellite signals from a plurality of satellites, a processor coupled with the GPS receiver for calculating the location of the GPS/radio unit as a function of the received satellite signals, and a radio receiver coupled with the processor for receiving the radio signals transmitted by said other units. The processor is adapted to identify the location of the other units based on the received radio signals. The GPS/radio unit also includes a display for indicating the location of at least one of the other units.

In another aspect of the present invention, a system is provided in which a plurality of portable GPS/radio units communicate with one another over a wireless radio network. The system comprises a first portable GPS/radio unit which has a GPS receiver for receiving satellite signals from a plurality of satellites, a processor for calculating the location of the first unit as a function of the received satellite signals, and a radio transmitter for transmitting radio signals indicative of the location of said first unit. The system further comprises a second portable GPS/radio unit having a GPS receiver for receiving satellite signals from a plurality of satellites, a processor for calculating the location of the second unit as a function of the received satellite signals, a radio receiver for receiving radio signals from one or more other portable units, and a display for indicating the location of the other portable units. Upon receiving radio signals indicative of the location of the first unit, the processor of the second unit identifies the location of the first unit based on the received radio signals.

In still another aspect of the present invention, a method is provided for displaying the location of a first portable GPS/radio unit on a second portable GPS/radio unit. The method comprises receiving a first set of satellite signals from a plurality of satellites at a first portable GPS/radio unit, calculating the location of the first unit as a function of the first set of received satellite signals, receiving a second set of satellite signals from a plurality of satellites at a second portable GPS/radio unit, calculating the location of the second unit as a function of the second set of received satellite signals, transmitting the location of the first unit to the second unit over a wireless radio network, and displaying the location of the first unit on the second unit.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE DRAWINGS

Figure 1:
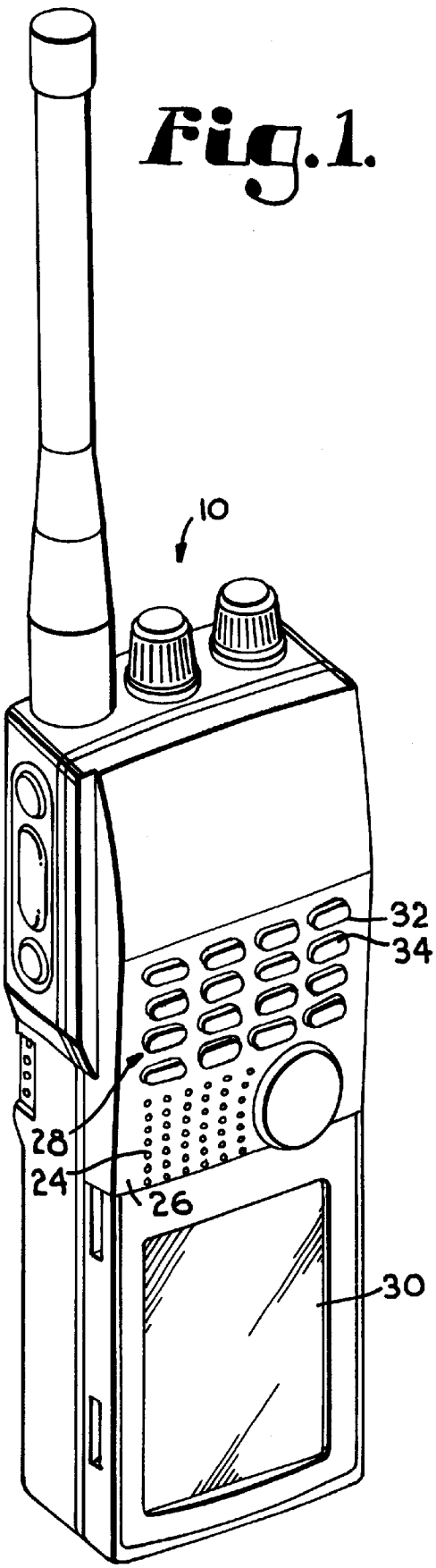
FIG. 1 is a perspective view of a combined GPS/radio unit in accordance with a preferred embodiment of the present invention.
Figure 2:
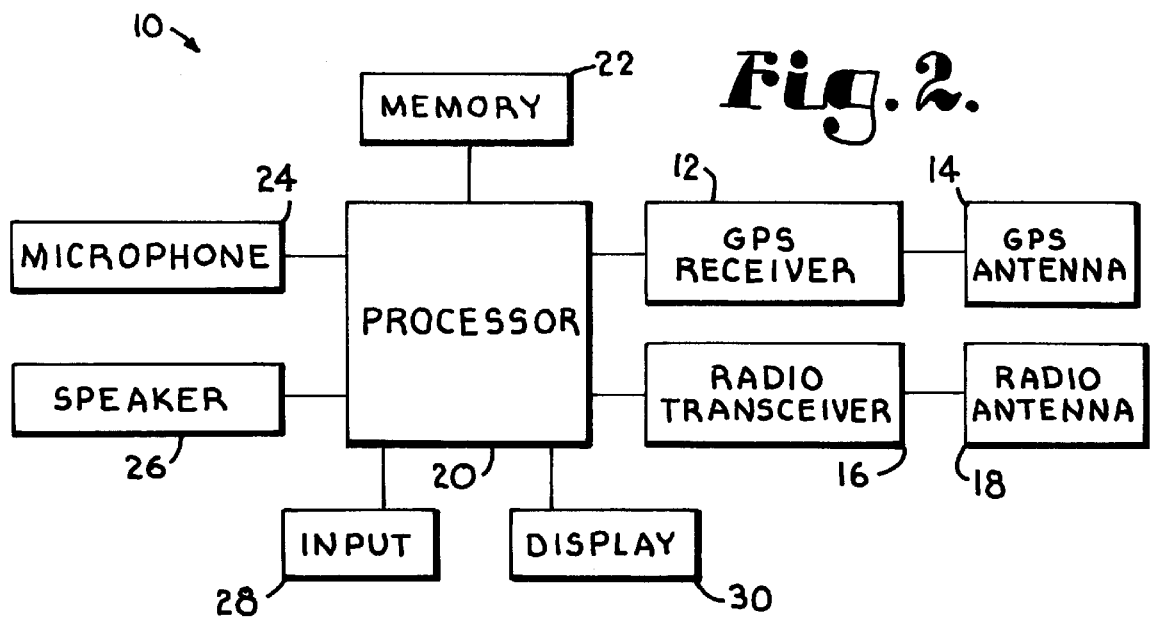
FIG. 2 is a block diagram of the components of the GPS/radio unit of FIG. 1.

Referring to the drawings in greater detail, and initially to FIGS. 1 and 2, the combined GPS/radio unit of the present invention is designated generally by reference numeral 10. Unit 10 comprises a GPS receiver 12, a GPS antenna 14, a radio transceiver 16 and a radio antenna 18. GPS receiver 12 and radio transceiver 16 are electronically coupled with a processor 20 which has an associated memory 22 for storing information such as cartographic data (i.e., electronic maps). The cartographic data may be stored on cartridges which can be removably attached to the unit. For example, an electronic map of a particular city or national park may be stored in a single cartridge. The memory may also store historical location data for the unit 10 or for other units which have transmitted location data to unit 10.

The handheld unit 10 also includes a microphone 24, a speaker 26, an input 28 and a display 30, which is preferably a liquid crystal display (LCD). The user input 28 is preferably an alphanumeric keypad, such as a telephone keypad, which may be used to select and input a name or other identifier for the unit using any combination of the letters, numbers or symbols which are available on the keypad. The keypad 28 shown in FIG. 1 includes four control buttons (the far right column of buttons) in addition to the 12 buttons which are standard on a telephone keypad. In a preferred embodiment, a first control button 32 is coupled with the processor so that depressing that button causes the unit 10 to immediately transmit a radio signal over the network indicative of the location of the unit 10. Similarly, a second control button 34 is preferably coupled with the processor so that depressing that button causes the unit 10 to immediately transmit a radio signal over the network requesting that other users transmit their locations over the network. As will be understood, the user input could be inputs other than a keypad, such as a microphone/voice recognition input, or touch screen, or a menu-driven display input.

Figure 3:
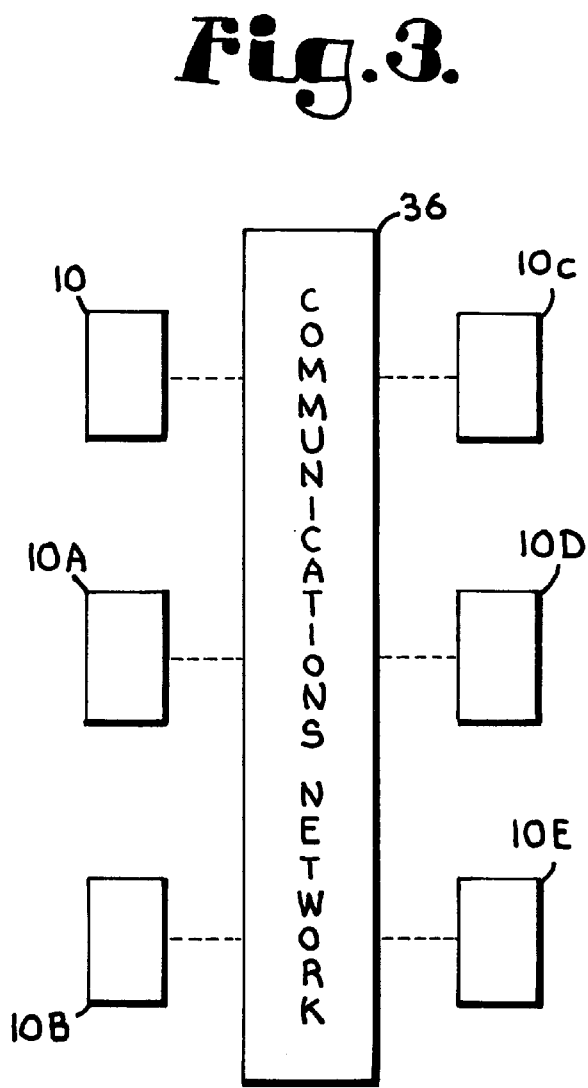
FIG. 3 is a block diagram of a communications networking linking the GPS/radio unit of FIG. 1 with a plurality of other GPS/radio units.

As shown in FIG. 3, unit 10 communicates with a plurality of other such units 10A, 10B, 10C, 10D and 10E over a wireless communications network 36. In the preferred embodiment of the present invention, units 10 and 10A–10E communicate with one another over a public radio network such as the Family Radio Service. While six units 10 and 10A–10E are shown in the exemplary embodiment of FIG. 3, only two such units are necessary for the purposes of the present invention.

Figure 4:
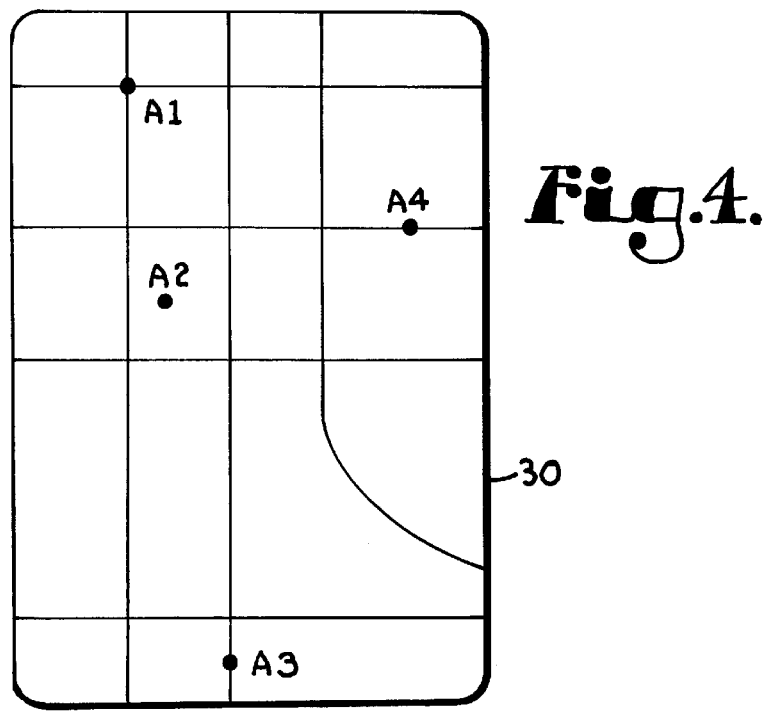
FIG. 4 is a schematic representation of a display on the GPS/radio unit of FIG. 1, wherein the display indicates the location of multiple GPS/radio units on an electronic map.

FIG. 4 is a schematic representation of an exemplary display on unit 10 in which the display 30 indicates the location of four different GPS/radio units. Although darkened circles are used in FIG. 4 to indicate the location of the four units, any other location designator could be used. Display 30 also indicates a unique alphanumeric identifier for each of the four units. For example, the identifiers A1, A2, A3 and A4 may correspond to units 10A, 10B, 10C and 10D, in which case the location of unit 10 would not be shown. Alternatively, the identifier A1 may correspond to unit 10 and the identifiers A2–A4 may correspond to units 10A–10C so that the location of unit 10 is shown on its display. While alphanumeric identifiers were selected in the example of FIG. 4, any available identifier (or combination of identifiers) could be used (e.g., letters, numbers, symbols, icons, colors, etc.) for the units. Moreover, an identifier could perform the dual function of identifying the unit and of indicating the location of the unit, thus eliminating the need for a darkened circle or other such location designator.

In use, unit 10 communicates with other GPS/radio units (e.g., units 10A–E) over the wireless communications network 36 in the same manner that conventional 2-way radios communicate with one another. In addition, these units are able to calculate their location and communicate that location data to one another since they are also equipped with GPS receivers. One way to communicate the location data over the network 36 is to divide the available bandwidth into a voice portion and a data portion so that voice and data are communicated simultaneously over the network. If only a small portion of the bandwidth is allocated for data transmission, there should be no noticeable degradation of the voice communication. Alternatively, the entire communication channel could be used for voice communication except for periodic interruptions during which a burst of location data is sent. If the period of the interruption is short, there should be no noticeable effect on the quality of the voice communication. The timing of the location data transmission should be based on the GPS clock. To decrease the likelihood of data collisions, the units can be configured to transmit location data on a "pseudo-random" basis. Preferably, the units continue to retransmit the location data until an acknowledgment is received. A third approach for communicating location data would be to monitor the network for the absence of voice communication and to transmit location data at that time.

There are many practical applications which would utilize the advantages of the present invention. For example, if a family or other small group is camping or hiking and each person is carrying a GPS/radio unit, then everyone can communicate with one another and see where everyone else is located. Since each person's position would be indicated on the electronic map displayed on each of the units, the other members of the group could quickly locate a member who becomes lost or injured. This would also be the case if the group is located in an urban or residential area.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A portable GPS/radio unit capable of wirelessly communicating with one or more other such units, wherein each of said other units is adapted to transmit radio signals indicative of that unit's location, said GPS/radio unit comprising:
- a GPS receiver for receiving satellite signals from a plurality of satellites;
- a processor coupled with said GPS receiver for calculating the location of said GPS/radio unit as a function of the received satellite signals;
- a radio receiver coupled with the processor for receiving the radio signals transmitted by said other units, said processor being adapted to identify the location of said other units based on the received radio signals;
- a display coupled with the processor for indicating the location of at least one of said other units;
- a transmitter coupled with said processor for transmitting a radio signal to at least one of said other units, wherein said radio signal is indicative of a location of said portable GPS/radio unit;
- a speaker and a microphone for permitting voice communications with said other units; and
- a portable, handheld housing for housing said GPS receiver, said processor, said radio receiver, said display and said transmitter.

2. The unit of claim 1 wherein said display also indicates the location of said GPS/radio unit.

3. The unit of claim 1 further comprising a memory associated with the processor.

4. The unit of claim 3 wherein cartographic data is stored in the memory and the display indicates at least a portion of the cartographic data.

5. The unit of claim 3 wherein historical location data for said GPS/radio unit is stored in the memory.

6. The unit of claim 1 wherein the radio signals received from one or more of said other units include an identifier associated with that unit.

7. The unit of claim 6 wherein the display indicates the identifier for at least one of said other units.

8. The unit of claim 1 wherein said radio transmitter and said radio receiver are embodied in a radio transceiver.

9. The unit of claim 1 further comprising a first button coupled with the processor for transmitting a radio signal indicative of the location of said GPS/radio unit over the network whenever said first button is depressed by the user.

10. The unit of claim 9 further comprising a second button coupled with the processor for transmitting a radio signal over the network whenever said second button is depressed by the user, wherein the radio signal contains a request that other users transmit their locations over the network.

11. The unit of claim 1 further comprising an input coupled with the processor for selecting an identifier for said GPS/radio unit.

12. A system in which a plurality of portable GPS/radio units wirelessly communicate with one another, said system comprising:
- a first portable GPS/radio unit having a GPS receiver for receiving satellite signals from a plurality of satellites, a processor coupled with said GPS receiver for calculating the location of said first unit as a function of the received satellite signals, a radio transmitter coupled with the processor for transmitting a radio signal including information indicative of the location of said first unit, a radio receiver, a microphone, a speaker, and a display; and
- a second portable GPS/radio unit having a GPS receiver for receiving satellite signals from a plurality of satellites, a processor coupled with said GPS receiver for calculating the location of said second unit as a function of the received satellite signals, a radio receiver coupled with the processor for receiving said radio signal from said first other portable unit, a display coupled with the processor, a microphone and a speaker for permitting voice communications with the first unit, and a radio transmitter coupled with said processor for transmitting a radio signal including information indicative of the location of the second unit;
- wherein the processor of said second unit, upon receiving said information indicative of the location of said first unit, displays an indication thereof on said display of said second, portable unit, and wherein the processor of said first unit, upon receiving said information indicative of the location of said second unit, displays an indication thereof on said display of said first portable unit.

13. The system of claim 12 wherein each said display indicates the respective locations of said first and second units.

14. The system of claim 12 further comprising a third portable GPS/radio unit having a GPS receiver for receiving satellite signals from a plurality of satellites, a processor coupled with said GPS receiver for calculating the location of said third unit as a function of the received satellite signals, and a radio transmitter coupled with the processor for transmitting radio signals indicative of the location of said third unit so that the processor of said second unit, upon receiving radio signals indicative of the location of said third unit, identifies the location of said third unit based on the received radio signals so that the display of said second unit indicates the respective locations of at least said first and third units.

15. The system of claim 12 further comprising a memory associated with the processor of said second unit.

16. The system of claim 15 wherein cartographic data is stored in said memory and the display of said second unit indicates at least a portion of the cartographic data.

17. The system of claim 15 wherein historical location data for said first unit is stored in the memory.

18. The system of claim 15 wherein historical location data for said second unit is stored in the memory.

19. The system of claim 12 wherein said first unit further comprises an input coupled with its processor for selecting an identifier associated with said first unit so that radio signals indicative of the location of said first unit are also indicative of the identifier.

20. The system of claim 19 wherein the display of said second unit displays the identifier for said first unit together with the location of said first unit.

21. The system of claim 12 wherein said first and second units each include a radio transceiver.

22. The system of claim 12 wherein the wireless radio network is a public radio network.

23. The system of claim 22 wherein the public radio network is the Family Radio Service.

24. The system of claim 12 wherein the radio transmitter of said first unit is adapted for transmitting radio signals indicative of the location of said first unit based on the GPS clock.

25. A method for displaying the location of a first portable GPS/radio unit on a second portable GPS/radio unit, said method comprising:

receiving a first set of satellite signals from a plurality of satellites at a first portable GPS/radio unit;

calculating the location of the first unit as a function of the first set of received satellite signals;

receiving a second set of satellite signals from a plurality of satellites at a second portable GPS/radio unit;

calculating the location of the second unit as a function of the second set of received satellite signals;

transmitting the location of the first unit to the second unit over a wireless radio network in association with a voice communication transmitted from the first unit to the second unit; and displaying the location of the first unit on the second unit.

26. The method of claim 25 further comprising displaying the respective locations of the first and second units on the second unit.

27. The method of claim 25 further comprising selecting an identifier associated with the first unit and displaying the identifier together with the location of the first unit.

28. The method of claim 25 further comprising selecting an identifier associated with the second unit and displaying the identifier together with the location of the second unit.

29. The method of claim 25 wherein said transmitting step occurs in response to a radio signal from the second unit requesting transmission of the location of the first unit.

30. The method of claim 25 wherein said transmitting step occurs upon depression of a button on the first unit by the user of the first unit.

31. The method of claim 25 wherein the timing of said transmission step is based on the GPS clock.

32. The method of claim 25 wherein said transmitting step occurs during an interruption in said voice communication.

33. The method of claim 25 wherein said transmitting step occurs at the same time as said voice communication.

34. The system of claim 25 wherein said radio signals are transmitted in a UHF 460 MHz band.

35. The system of claim 1 wherein said radio transmitter and said radio receiver transmit and receive radio signals, respectively, in a UHF 460 MHz band.

36. An electronic system comprising:

a first, portable electronic device having a processor, a transmitter, and a receiver; and a second, portable electronic device having a processor, a transmitter, and a receiver, wherein said first portable electronic device determines its location and wirelessly sends a signal indicative of its said location to said second portable electronic device, and wherein said second portable electronic device determines its location and wirelessly sends a signal indicative of its said location to said first portable electronic device;

wherein said first portable electronic device has a display and said second portable electronic device has a display wherein said display of each device displays information indicative of said determined location of each unit; and wherein each said portable electronic device has a microphone and a speaker for permitting voice communication between said first and second devices.

37. The system as set forth in claim 36, wherein said displayed information indicative of the location of each said device permits a user of one of the devices to visualize the user's relative to the location relative to the other one of said devices.

38. GPS/radio unit capable of wirelessly communicating with one or more other such units, wherein each of said other units is adapted to transmit radio signals indicative of that unit's location, said GPS/radio unit comprising:

a processor;

a transmitter;

receiver, wherein said GPS/radio unit determines its location and wirelessly transmits a signal indicative of its said determined location to at least one of said other units, and wherein said GPS/radio unit wirelessly receives a signal, from at least one of said other units, indicative of the location of the unit from which said received signal is transmitted;

wherein said first portable electronic device has a display and said second portable electronic device has a display wherein said display of each device displays information indicative of said determined location of each unit; and wherein said portable GPS/radio unit further comprises:

a microphone; and a speaker, wherein said GPS/radio unit is adapted for voice communication with one or more of said other such units.

39. The portable GPS/radio unit as set forth in claim 38 further comprising:

a display for displaying an indication of said determined location of said GPS/radio unit and information indicative of a location of each said unit from which a received signal is received.

40. The portable GPS/radio unit as set forth in claim 38 wherein said radio signal is transmitted in a UHF 460 MHz band.

41. The portable GPS/radio unit of claim 1, wherein said microphone and said speaker permit voice communication with at least one of said other such units, and wherein said transmitted radio signal indicative of said location of said unit is transmitted in association with a voice communication.

42. The portable GPS/radio unit of claim 1, wherein said microphone and said speaker permit voice communication, and wherein said received radio signals indicative of a unit's location are each transmitted from a respective said unit in association with a voice communication from such unit.

43. The portable GPS/radio unit of claim 1, wherein said unit wirelessly communicates via a public radio network.

44. The portable GPS/radio unit of claim 43, wherein said public radio network comprises the Family Radio service.

45. The system of claim 12, wherein said microphone and said speaker of each said unit permits voice communication between said first and said second units, and wherein said transmitted and received radio signals including information indicative of location are associated with voice communications between said first and said second units.

46. The system as set forth in claim 36, wherein said sent signal indicative of a location of said first unit is sent in association with a voice communication from the first unit to the second unit, and wherein said sent signal indicative of a location of said second unit is sent in association with a voice communication from the second unit to the first unit.

47. The system as set forth in claim 36, wherein said first and second units wirelessly communicate via a public radio network.

48. The system as set froth in claim 47, wherein said public radio network comprises the Family Radio service.

49. The portable GPS/radio unit of claim 38, wherein said radio signal is transmitted via Family Radio service.

* * * * *

UNITED STATES PATENT AND TRADEMARK OFFICE
CERTIFICATE OF CORRECTION

PATENT NO. : 6,373,430 B1
DATED : April 16, 2002
INVENTOR(S) : Lawrence W. Beason et al.

It is certified that error appears in the above-identified patent and that said Letters Patent is hereby corrected as shown below:

<u>Title page,</u>
Item [73], spelling of assignee's name is corrected to read:
-- Garmin Corporation --

Signed and Sealed this

Seventeenth Day of December, 2002

JAMES E. ROGAN
*Director of the United States Patent and Trademark Office*